United States Patent [19]

Huynh et al.

[11] Patent Number: 5,491,766
[45] Date of Patent: Feb. 13, 1996

[54] BONDING ASSEMBLY FOR FIBER OPTIC CABLE AND ASSOCIATED METHOD

[75] Inventors: Van L. Huynh, Garner; Robert M. Bower, Cary; Steven D. Griffin, Apex; Deborah A. Mickus, Raleigh, all of N.C.

[73] Assignee: Raychem Corporation, Menlo Park, Calif.

[21] Appl. No.: 298,234

[22] Filed: Aug. 30, 1994

Related U.S. Application Data

[63] Continuation of Ser. No. 48,721, Apr. 16, 1993, abandoned.

[51] Int. Cl.$^6$ ............................... G02B 6/36; H01R 4/66
[52] U.S. Cl. ........................ 385/100; 385/101; 385/76; 385/135; 439/98; 439/99
[58] Field of Search ........................ 385/100, 101, 385/139, 76, 86, 135; 439/98, 99, 452

[56] References Cited

U.S. PATENT DOCUMENTS

| Re. 28,468 | 7/1975 | Baumgartner et al. ............ 439/99 |
|---|---|---|
| 3,499,972 | 3/1970 | Smith .................... 174/88 R |
| 4,632,507 | 12/1986 | Mignien et al. ............ 350/96.21 |
| 4,674,832 | 6/1987 | Hirai et al. ............ 350/96.2 X |
| 4,708,427 | 11/1987 | Ejiri et al. ............ 350/96.2 |
| 4,737,010 | 4/1988 | Le Maitre et al. ............ 350/96.2 |
| 4,753,499 | 6/1988 | Malkani et al. ............ 350/96.2 |
| 4,790,626 | 12/1988 | Bonicel et al. ............ 350/96.2 |
| 4,795,230 | 1/1989 | Garcia et al. ............ 350/96.2 |
| 4,805,979 | 2/1989 | Bossard et al. ............ 385/135 |
| 4,895,525 | 1/1990 | Leonardo ............ 439/99 |
| 4,927,727 | 5/1990 | Bensel, III et al. ............ 385/135 |
| 4,944,683 | 7/1990 | Leonardo ............ 439/96 |
| 4,961,623 | 10/1990 | Midkiff et al. ............ 350/96.2 |
| 4,986,761 | 1/1991 | Gladden, Jr. et al. ............ 439/99 |
| 5,071,221 | 12/1991 | Fujitani et al. ............ 385/100 |
| 5,073,043 | 12/1991 | DiMarco et al. ............ 385/81 |
| 5,121,458 | 6/1992 | Nilsson et al. ............ 385/100 |

OTHER PUBLICATIONS

AT&T Practice, Instruction Sheet, Issue 1, Feb. 1989, pp. 1–2, AT&T 636-299-110-3, Produced by the AT&T Documentation Management Organization.

Raychem System Practice, FOSC 100D Fiber Optic Closure System, Section RYCH-FO-100D, Issue 2, Mar. 1990, pp. 1–36.

Raychem Telecom, DWBS, Installation Procedure, Jun. 1987, pp. 1–4.

*Primary Examiner*—Rodney B. Bovernick
*Assistant Examiner*—Hemang Sanghavi
*Attorney, Agent, or Firm*—Herbert G. Burkard; William D. Zahrt, II

[57] ABSTRACT

A fiber optic cable bonding assembly includes a base member, a shield clamping member, and a strength member clamping member assembled in stacked relation. The fiber optic cable has a core, a metallic shield, at least one lengthwise extending strength member, and an overall jacket. A portion of the jacket is removed leaving exposed a portion of the metallic shield and the strength members. The base member has a tongue portion inserted between the shield and an underlying portion of the cable core. The shield clamping member overlies the shield to clamp the shield with the base member. A strength member clamping member overlies the strength members and the shield clamping member to clamp the strength members in a longitudinally extending direction. A threaded stud carried by the base member connects the base member, shield clamping member, and strength member clamping member together, as well as secures an end portion of a bonding strap to the stud.

36 Claims, 3 Drawing Sheets

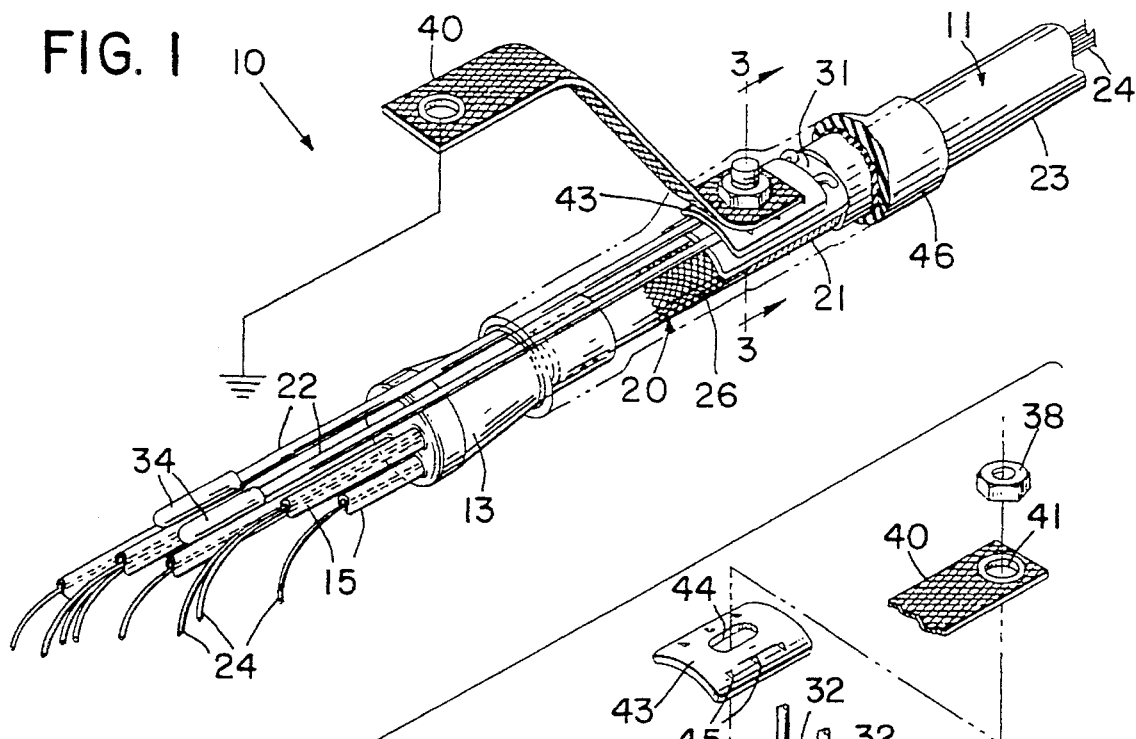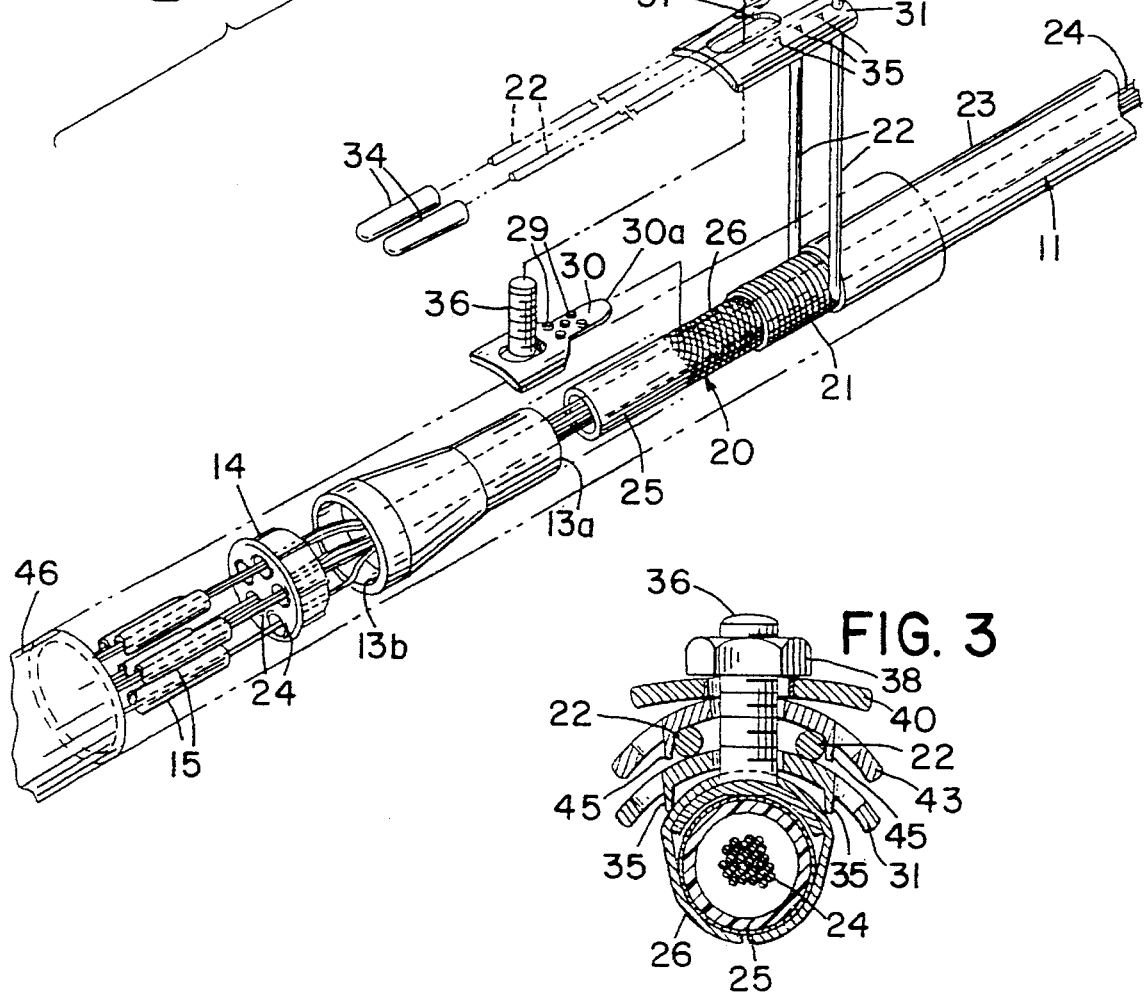

BONDING ASSEMBLY FOR FIBER OPTIC CABLE AND ASSOCIATED METHOD

This application is a continuation of application Ser. No. 08/048,721, filed Apr. 16, 1993, now abandoned.

FIELD OF THE INVENTION

This invention relates to fiber optic cables and, more particularly, to an assembly and associated method for electrically bonding metallic components of fiber optic cables.

BACKGROUND OF THE INVENTION

Fiber optic cables are widely used in a variety of telecommunications applications, such as for long distance telephone networks spanning large geographic areas. A typical loose-buffered fiber optic cable for such an application includes a plurality of optical fibers contained within a cable core, in turn, protected by an overall jacket. The fibers may be maintained in identifiable groups by respective binder yarns within a centrally located single plastic buffer tube, or groups of fibers may be carded by a series of buffer tubes surrounding a central supporting member. Fiber optic cables may also include a plurality of tight-buffered fibers also collectively protected by an overall protective jacket.

One type of fiber optic cable includes a metallic shield surrounding the cable core. The metallic shield may be provided for rodent protection in a direct buffed or underground cable installation. An outer plastic jacket surrounds the metallic shield. It is also common in such a cable to incorporate lengthwise extending strength members within the cable jacket. For example, one version of an LXE® Lightguide Cable manufactured by AT&T includes a central loose-buffer tube, a surrounding corrugated metallic shield, and a pair of spaced apart metallic wires extending lengthwise along opposite sides of the o metallic shield.

The metallic components within a fiber optic cable are typically electrically grounded at predetermined points along the cable route, such as at splicing and termination points. This protects from electrical currents induced by power system disturbances, that is, nearby faults or from lightning induced surges.

The ends of fiber optic cables, and hence the electrical bonding assemblies for the metallic cable components, are typically housed within a protective splice closure. The splice closure is typically sealed to prevent the ingress of water into the splice closure which could o damage the optical fibers and/or splices. Such splice closures are disclosed, for example, in U.S. Pat. No. 5,121,458 entitled Preterminated Fiber Optic Cable to Nilsson, et al., U.S. Pat. No. 4,961,623 entitled Preterminated Optical Cable to Midkiff, et al., and U.S. Pat. No. 4,805,979 entitled Fiber Optic Cable Splice Closure to Bossard, et al.

A conventional bonding clamp for a telephone cable including multiple pairs of insulated copper conductors surrounded by an overall aluminum shield is disclosed in U.S. Pat. No. 4,895,525 entitled Cable Shield Grounding Clamp Connector to Leonardo. The bonding clamp includes a shoe plate or base member inserted between o the core of copper pairs and the surrounding metallic shield. The shoe plate has a threaded stud extending upwardly therefrom and scraping projections, extending upwardly along the opposite lengthwise edges of the shoe. A bonding plate having an opening therein receives the stud of the shoe and the bonding plate is positioned to overlie the outer protective jacket of the cable. The shoe and the bonding plate of the clamp have different radii of curvature so that they are biased apart. This conventional copper telephone cable bonding clamp, however, is undesirable for fiber optic applications where the cable includes o strength members.

U.S. Pat. No. 4,927,227 entitled Optical Fiber Cable Closure to Bensel, III, et al., and assigned to AT&T discloses a fiber optic splice closure including an electrical bonding clamp (the "AT&T clamp") for the metallic components within a fiber optic cable. The AT&T clamp includes a shoe plate having a threaded stud extending radially outwardly therefrom. The shoe is inserted between the cable core and the metallic shield of the cable. A first L-shaped member is secured with a portion overlying the shoe and on the opposite side of the metallic shield to thereby clamp the shield between the shoe and the first L-shaped member. A second L-shaped member is secured to the vertically extending portion of the first L-shaped member. A bonding block is secured to the vertically extending portions of the first and second L-shaped members so that the lengthwise extending strength members may be bent to extend in a radially outward direction from the cable and, thus, clamped between the bonding block and the second L-shaped member. The bonding block includes a pair of openings and associated set screws to secure a ground wire to the clamp to establish an electrical connection thereto.

Conventional fiber optic bonding damps, such as the AT&T clamp, may unfortunately permit relative movement between the strength members and the cable jacket so that water may migrate from the end of the cable and into the splice closure. Accordingly, such a bonding clamp is desirably partitioned off into a separate compartment within the splice closure to prevent water from entering into the splice area as shown in U.S. Pat. No. 4,927,227. The compartment is also filled with a water blocking compound.

When more than one conventional bonding clamp such as the AT&T clamp is used in a partitioned splice closure, all of the damps are connected to a common ground surrounded by the water blocking compound. Accordingly, the common electrical connection inhibits locating individual fiber optic cables in an underground installation, since signals cannot be separately introduced to the metallic shields of individual fiber optic cables.

The orientation of the strength members extending radially outward from the AT&T clamp precludes securing the strength members within the closure for additional support of the cable. The AT&T clamp is also relatively large compared to the cable and may prohibit installation of the clamp prior to insertion of the cable end into an opening in the end cap of the splice closure.

SUMMARY OF THE INVENTION

It is therefore an object of the present invention to provide a bonding assembly and associated method for both the metallic shield and the strength members of a fiber optic cable that provides good electrical bonding and also mechanically secures the strength members to reduce the likelihood of water migration from the cable.

It is another object of the invention to provide a relatively compact and readily installable bonding assembly for a fiber optic cable.

These and other objects, features and advantages of the invention are provided by a bonding assembly for a fiber optic cable including a stacked assembly off a base member, a shield clamping member, and a strength member clamping member. Connecting means connects the members together to electrically connect to the shield and to mechanically terminate and electrically connect to at least one strength member in the cable. In other words, the shield clamping member and the strength member clamping member provide clamping means, connected to the base member and overlying the exposed shield portion, for clamping to the exposed shield portion and for clamping exposed portions of the strength members and guiding the strength members to extend in a generally longitudinal direction.

As would be readily understood by those skilled in the art, the bonding assembly according to the invention is used with a fiber optic cable of the type including an elongate core, a metallic shield surrounding the core, at least one strength member extending longitudinally adjacent the shield, and a jacket surrounding the shield and the at least one strength member. The bonding assembly is attached to the fiber optic cable at a portion thereof, such as at an end to be terminated, where a portion of the jacket has been removed thereby exposing the underlying shield and the at least one strength member. As would be readily understood by those skilled in the art, such cables typically include a pair of spaced apart wires serving as strength members. Accordingly, to simplify the following description, the plural term "strength members" is sometimes used herein, it being understood that a single strength member may also be readily accommodated by the bonding assembly according to the invention.

More particularly, the base member preferably has an end adapted to be inserted between an exposed shield portion and a corresponding underlying core portion of the fiber optic cable. The base member also preferably includes a plurality of projections extending outwardly from the end to scrape adjacent portions of the shield thereby enhancing electrical contact and mechanically securing the base member in position.

The shield clamping member is adapted to overlie the exposed shield portion and cooperate with the base member for clamping the exposed shield portion therebetween. Similarly, the strength member clamping member is adapted to overlie exposed portions of the strength members and cooperate with the shield clamping member for clamping the strength members therebetween. Moreover, the strength member clamping member and the shield clamping member cooperate so that the exposed portion of the strength members extends in a generally longitudinal direction adjacent the cable core. Connecting means, preferably a threaded stud carded by the base member, connects together the base member, shield clamping member, and strength member clamping member. Thus, a compact, or low-profile, arrangement for the bonding assembly is achieved.

An electrical bonding strap is also preferably provided having an end secured to the threaded stud. The bonding strap may, in turn, be connected to a ground, within a splice closure, for example. In addition, each of the base member, shield clamping member, and strength member clamping member preferably have an arcuate transverse cross-sectional shape roughly corresponding to the radius of curvature of the fiber optic cable.

The shield clamping member preferably has a first portion adapted to be positioned adjacent where the exposed portions of the strength members emerge from the cable jacket. The first portion of the shield clamping member has at least one guide opening that is adapted for receiving therethrough the exposed portion of the at least one strength member. In one embodiment of the invention, the shield clamping member also preferably has a second portion downstream from the first portion including at least one radially outwardly extending guide hook that is adapted for receiving therethrough the longitudinally extending exposed portions of the strength members.

In one embodiment of the invention, the shield clamping member rests upon only the exposed portion of the cable. In other words, in this embodiment a relatively short shield clamping member is provided wherein the first portion is an end portion. In another embodiment of the invention, the shield clamping member is longer and extends upstream over a jacketed portion of the cable. Thus, in this embodiment the shield clamping member also includes a third portion upstream from the first portion adapted to overlie a portion of the cable jacket. A fastener is preferably positioned surrounding the third portion of the shield clamping member and the underlying portion of the cable jacket to provide greater mechanical stability for the bonding assembly.

The strength member clamping member also preferable carries at least one pair of spaced apart projections extending radially inwardly therefrom. These projections further confine the strength members between the strength member clamping member and the shield clamping member.

Another aspect of the present invention is that sealing means is preferably applied surrounding the exposed portion of the fiber optic cable and the other portions of the bonding assembly to prevent moisture migration from the fiber optic cable. As would be readily understood by those skilled in the art, the sealing means preferably includes a heat recoverable tube and a water blocking compound for filling voids underlying said tube. A suitable sealing means is described in a copending application entitled Fiber Optic Cable System Including Main and Drop Cables and Associated Fabrication Method, assigned to the present assignee, the disclosure of which is hereby incorporated herein by reference.

The cable strength members are well secured relative to the other cable components and are, therefore, less likely to move relative to the other cable components. Accordingly, moisture migration from the end of the cable is less likely to occur. In addition, because the bonding assembly prevents the migration of water from the cable end, it does require a partitioned splice closure, as does, for example, the AT&T bonding clamp disclosed in U.S. Pat. No. 4,927,227 and discussed above. When a plurality of cables are terminated in a common splice closure, the bonding straps according to the invention may be individually accessed. The bonding assembly of the present invention also presents a relatively compact profile and may thus be positioned onto a cable end prior to its insertion into a splice closure.

A method according to the present invention for bonding a fiber optic cable includes the steps of establishing both an electrical and mechanical connection to an exposed shield portion of the fiber optic cable; guiding an exposed portion of the strength members to extend in a longitudinal direction adjacent the electrical and mechanical connection; and securing the longitudinally extending exposed portion of the strength members to the electrical and mechanical connection.

The step of establishing both the electrical and mechanical connection preferably includes the steps of providing a base member and inserting an end portion thereof between the exposed shield portion and a corresponding underlying core portion of the fiber optic cable, and providing a shield clamping member and clamping the shield clamping member overlying the exposed shield portion. In addition, the step of securing the longitudinally extending exposed portions of the strength members includes providing the strength member clamping member and clamping same overlying the exposed portions of the strength members.

The steps of clamping both the shield clamping member and the strength member clamping member includes positioning a threaded stud carried by the base member through respective openings in both the shield and strength member clamping members and securing an end of the threaded stud. The method also preferably includes the step of sealing the fiber optic cable and the electrical and mechanical connection for preventing moisture migration from the fiber optic cable.

BRIEF DESCRIPTION OF THE DRAWINGS

FIG. I is a perspective view of a first embodiment of a fiber optic cable bonding assembly according to the invention with a portion of heat recoverable tubing and water blocking material removed for clarity.

FIG. 2 is an exploded perspective view of the fiber optic cable bonding assembly as shown in FIG. 1.

FIG. 3 is an enlarged transverse cross-sectional view of the fiber optic cable bonding assembly taken along lines 3—3 of FIG. 1.

DETAILED DESCRIPTION OF THE PREFERRED EMBODIMENTS

Figure 4:
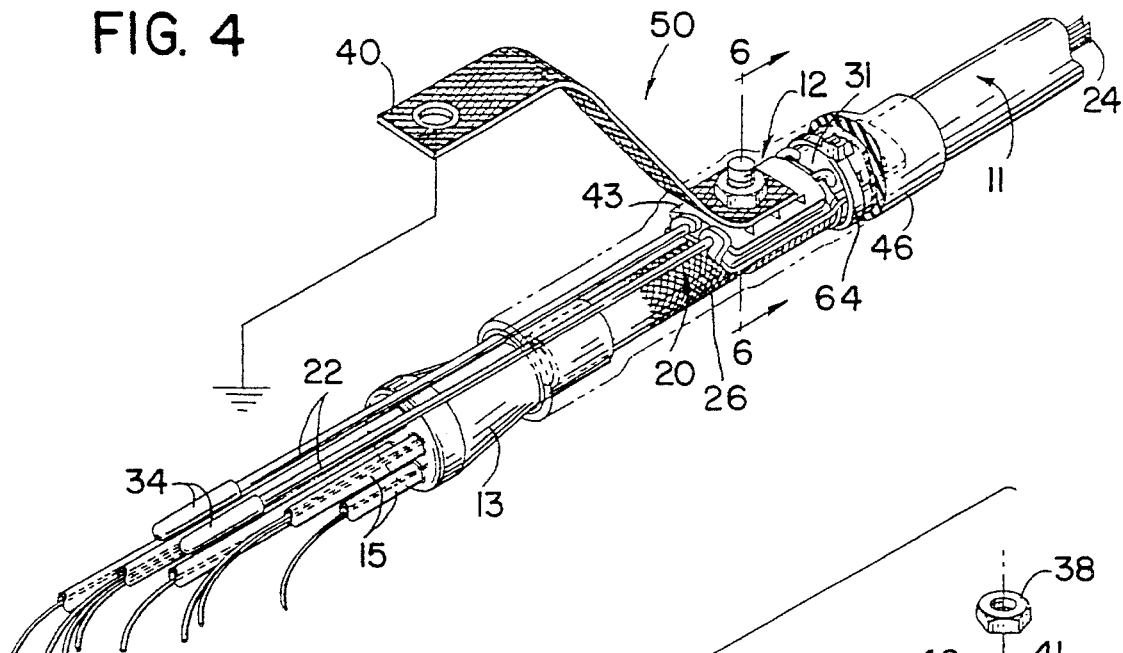
FIG. 4 is a perspective view of a second embodiment of a fiber optic cable bonding assembly according to the invention with a portion of heat recoverable tubing and water blocking material removed for clarity.

The present invention now will be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements in alternate embodiments.

Referring now to FIGS. 1–3, a first embodiment of a fiber optic cable bonding assembly 10 according to the present invention is illustrated. The bonding assembly 10 is attached to an end portion of a fiber optic cable 11. As would be readily understood by those skilled in the art, the fiber optic cable bonding assembly 10 is typically used at a cable or termination point, such as a splice point, or at any point where it is desired to establish electrical contact to the metallic fiber optic cable components and secure any strength member contained therein.

In the illustrated embodiment, the fiber optic cable end 11 may be connected to a breakout funnel 13 having a first smaller end 13a adjacent the fiber optic cable end and a second larger end 13b downstream therefrom. A funnel cap 14 having a plurality of openings therein may be secured to the second larger end 13b of the funnel 13. A plurality of predetermined groups of optical fibers 24 extend through the apertures in the funnel cap 14. Each group of optical fibers is carried in o a breakout tube 15 for further protection and routing within a splice closure, not shown, for splicing.

As would be readily understood by those skilled in the art, the fiber optic cable bonding assembly 10 of the present invention may be readily used in conjunction with other types of fiber optic cable including loose-buffered cable of the stranded type, as well as tight-buffered cables.

The end portion of the fiber optic cable 11 includes an elongate core 20, a metallic shield 21 surrounding the core 20, a pair of lengthwise extending strength members 22, and a protective jacket 23 surrounding the metallic shield and the strength members. The core 20 of the fiber optic cable includes a plurality of optical fibers 24 disposed within one or more protective buffer tubes 25. A fabric water blocking tape 26 surrounds a single buffer tube 25 in the illustrated embodiment.

The metallic shield 21 surrounding the core 20 is preferably corrugated to provide strength and to retain flexibility of the cable 11. The longitudinally extending strength members 22 are metal wires disposed between the metallic shield 21 and the jacket 23. The strength members 22 are preferably metallic, but may also be other materials as well, such as fiberglass reinforced plastic or a polyaramid yarn, such as KEVLAR®. While a pair of oppositely positioned strength members 22 are illustrated, any number of strength members may also be accommodated. In addition, each strength member 22 may be provided by a stranded bundle of wires, for example, as would be readily understood by those skilled in the art.

The protective jacket 23 surrounding the metallic shield 21 is preferably formed of a durable plastic material, such as polyethylene. In addition, the cable 11 is preferably prepared by stripping away a portion of the jacket 23 to expose an end portion of the metallic shield 21 and end portions of the strength members 22, as shown.

The bonding assembly 10 includes a base member 30 having an end 30a, or tongue portion, inserted between the exposed end portion of the metallic shield 21 and a corresponding underlying portion of the core 20. In addition, the base member 30 may preferably include upstanding projections 29 for scraping through a coating on the metallic shield 21 and thereby establishing good electrical contact therewith. In the illustrated embodiment, the projections 29 are generally cylindrical in shape and may be integrally formed with the base member 30 by a stamping operation, as would be readily understood by those skilled in the art.

The shoe 30 preferably has an arcuate cross-sectional shape as shown in FIG. 3. The radius of curvature of the shoe 30 also preferably corresponds roughly to the radius of curvature of the fiber optic cable core 20, although a single arcuate shape may readily accommodate a wide range of cable sizes.

The bonding assembly 10 also includes a shield clamping member 31 overlying the exposed end portion of the metallic shield 21 and cooperating with the base member 30 to damp the shield portion therebetween. The shield clamping member 31 may also include two rows of radially inwardly extended pointed projections 45, or tangs, integrally formed in the shield clamping member by a stamping operation as would be readily understood by those skilled in the art. The pointed projections 45 serve to dig into the metallic shield 21 to ensure good electrical and mechanical connection thereto.

The shield clamping member 31 includes a first, or end, portion adjacent the fiber optic cable portion where the strength members 22 emerge from the cable jacket 23. As shown perhaps best by the exploded view of FIG. 2, the shield clamping member 31 preferably includes at least one guide opening 32 in the first portion thereof, through which the strength members 22 extend in a radially outward direction. In the illustrated embodiment, a pair of spaced apart openings 32 are provided to receive respective ones of the pair of strength members 22. In addition, the guide openings 32 are closely sized to the diameter of the strength members 22 so that the strength members are bent at approximately a right angle as they pass through the openings and extend along the shield clamping member 31 in a longitudinally extending direction.

The bonding assembly 10 also preferably includes a strength member clamping member 43 overlying the shield clamping member 31 and the exposed end portions of the strength members 22. The strength member clamping member 43 cooperates with the shield clamping member 31 to guide and secure the strength members 22 in a longitudinally extending direction, as illustrated. The strength members 22 extending outwardly from the end of the strength member clamping member 43 may be terminated and covered with protective caps 34 as shown in the illustrated embodiment of FIGS. I and 2. Alternatively, the strength members 22 may continue to extend lengthwise, such as within a splice closure, and be secured within the splice closure to thereby provide a more secure cable termination.

The bonding assembly 10 also includes connecting means for connecting the base member 30, shield damping member 31, and the strength member clamping member 43 together so as to clamp the exposed end portion of the metallic shield 21 and the exposed portion of the strength members 22. The connecting means preferably is provided by a threaded stud 36 carried by the base member 30 and extending radially outwardly therefrom. In addition, the connecting means preferably includes an opening 37 in the shield clamping member 31 and an opening 44 in the strength member clamping member 43 for receiving therethrough the threaded stud 36. A bonding strap 40 also includes an opening 41 for receiving therethrough the threaded stud 36, and a nut 38 is secured on the end of the stud 36.

The strength member clamping member 43 also preferably includes one or more pairs of radially inwardly extending projections 45, or tangs, for further confining the strength members 22 and also for establishing good electrical contact with the underlying shield clamping member 31. The strength member clamping member 43 also preferably has an arcuate cross-sectional shape with a radius of curvature corresponding roughly to the radius of curvature of the cable 11.

The bonding strap 40 secured between the strength member clamping member and the nut 38 secured to the threaded stud 36 is preferably an electrically conductive braided flexible strap, as illustrated. As would be readily understood by those skilled in the art, the braided strap preferably includes a soldered medial portion for preventing water migration through the strap. An opposite end of the bonding strap 40 may be removably secured to a suitable electrical o ground within a splice closure. Accordingly, a radio frequency (RF) signal may be introduced by connection to the bonding strap 40 when removed from ground, such as for locating an underground cable. As would be readily understood by those skilled in the art, a stranded or solid wire may also be used in place of the braided strap 40 illustrated.

Figure 6:
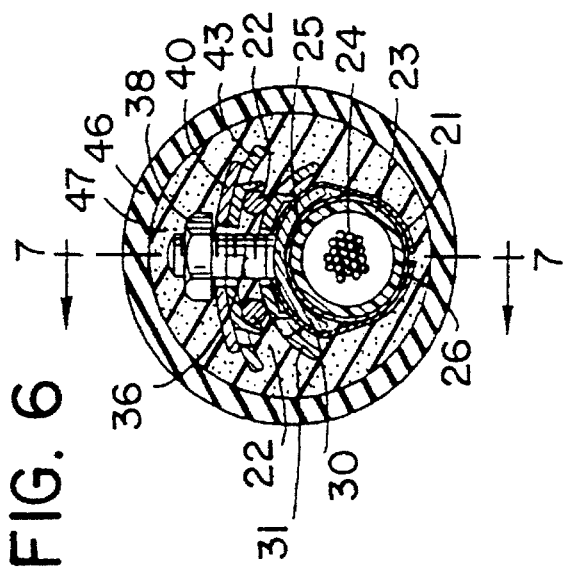
FIG. 6 is an enlarged transverse cross-sectional view of the fiber optic cable bonding assembly taken along lines 6—6 of FIG. 4, also showing the heat recoverable tubing and water blocking material thereof.
Figure 7:
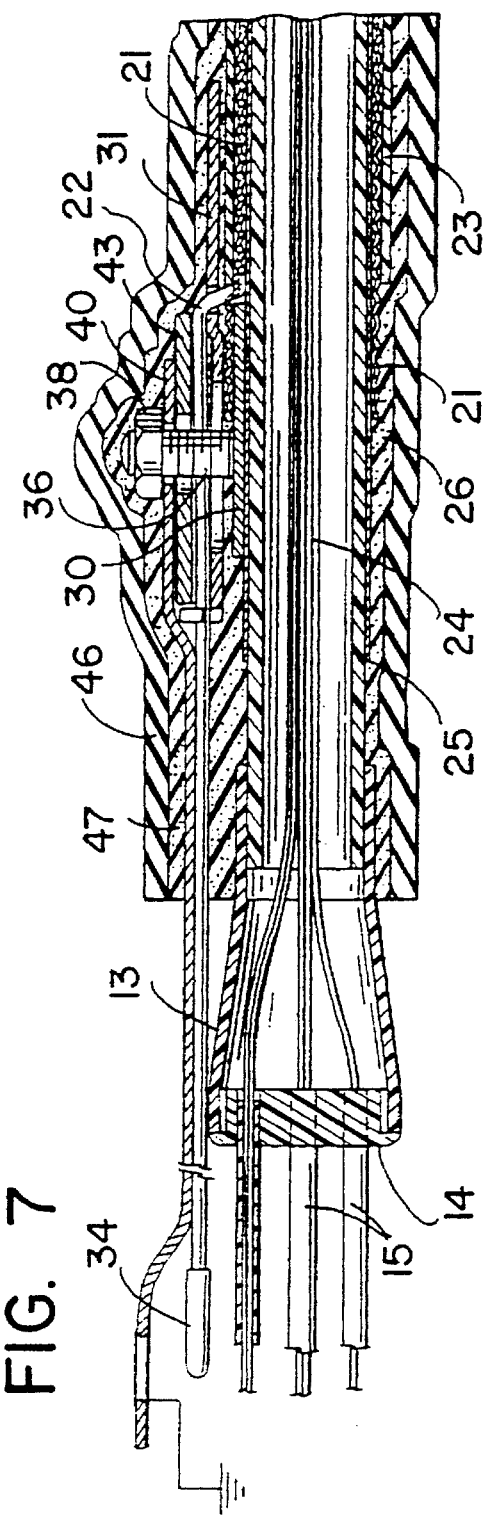
FIG. 7 is an enlarged longitudinal cross-sectional side view of the fiber optic cable termination assembly taken along lines 7—7 of FIG. 6.

The fiber optic cable bonding assembly 10 also preferably includes sealing means surrounding both an end portion 11 of the fiber optic cable and the other components for preventing moisture migration from the end portion of the fiber optic cable. The sealing means preferably includes a tube 46 surrounding an end portion 11 of the fiber optic cable .and the underlying components and a water blocking compound 47 (see FIGS. 6 and 7) filling any voids between the interior of the tube 46 and the underlying components. The tube 46 is preferably a heat recoverable plastic tube as would be readily known to those skilled in the art.

A second embodiment of the bonding assembly 50 according to the invention is shown in FIGS. 4–7. To facilitate understanding of this embodiment, like reference numbers are used to designate like elements as in the embodiment shown in FIGS. 1–3 and described above. Accordingly, only additional elements or differences in the second embodiment need be described below.

Figure 5:
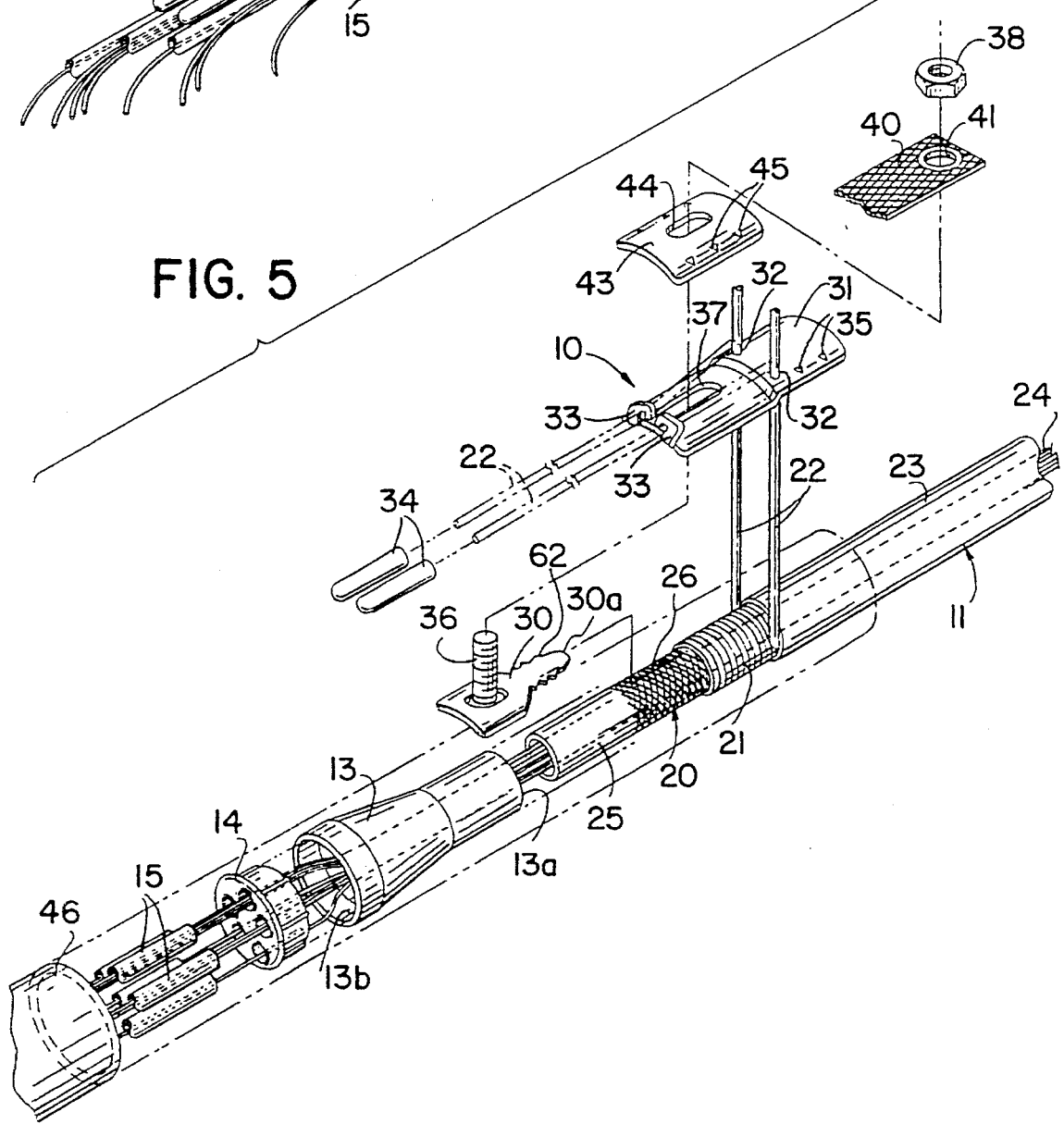
FIG. 5 is an exploded perspective view of the fiber optic cable bonding assembly as shown in FIG. 4.

As shown best in FIG. 5, the bonding assembly 50 includes a base member 30 having a series of sawtooth-like projections 62 on opposing side edges of its tongue portion. These projections 62 scrape the shield 21 to ensure better electrical contact and also serve to anchor the base member between the shield and the core 20. The sawtooth-like projections 62 may be extended farther back along the sides of member 30, as desired, for particular applications. Also, projections (not show), such as the projections 29 shown in FIG. 2, may be included for enhanced current carrying capacity.

The bonding assembly 60 also includes a shield clamping member 31 with a greater longitudinal extent as shown in FIG. 2. In other words, the shield clamping member 31 includes a portion extending upstream from the guide openings 32 and overlying a portion of the cable 11 where the cable jacket 23 has not been removed. A fastener, such as a tie wrap 64, surrounds the shield clamping member 31 and the cable to provide even greater mechanical stability for the bonding assembly 60. As shown, the locking portion of the tie wrap 64 is desirably positioned to be in line with the threaded stud 36.

The shield clamping member 31 also includes a pair of radially outwardly extending hooks 33 carried by an end portion of the member downstream from the portion of the member through which the guide openings 32 extend. The guide hooks 33 also preferably face inward to one another as shown in the illustrated embodiment. Thus, the longitudinally extending strength members 22 are guided through the guide openings 32 in the medial portion of the shield clamping member 31, are bent, and redirected in a longitudinal direction and pass through guide hooks 33.

A method according to the present invention for bonding a fiber optic cable 11 includes the steps of establishing both an electrical and mechanical connection to an exposed shield portion 21 of the fiber optic cable; guiding an exposed portion of the strength members 22 to extend in a longitudinal direction adjacent the electrical and mechanical connection; and securing the longitudinally extending exposed portion of the strength members to the electrical and mechanical connection. An electrical bonding strap 40 is preferably connected to the electrical connection to the exposed shield portion.

The step of establishing both the electrical and mechanical connection preferably includes the steps of providing a base member 30 and inserting an end portion thereof between the exposed shield portion 21 and a corresponding underlying core portion 20 of the fiber optic cable, and providing a shield clamping member 31 and clamping the shield clamping member overlying the exposed shield portion. In addition, the step of securing the longitudinally extending exposed portions of the strength members 22 includes providing the strength member clamping member 43 and clamping same overlying the exposed portions of the strength members.

The steps of clamping both the shield clamping member 31 and the strength member clamping member 43 includes positioning a threaded stud 36 carried by the base member 30 through respective openings in both the shield and strength member clamping members and securing an end of the threaded stud. The method also preferably includes the step of sealing the fiber optic cable 11 and the electrical and mechanical connection to the exposed shield portion for preventing moisture migration from the fiber optic cable.

The shield clamping member 31 also preferably includes at least one guide opening 32 in a first portion thereof adjacent where the exposed portions of the strength members 22 emerge from the cable jacket 23. Accordingly, the method also preferably includes the step of guiding the exposed portions of the strength members 22 through the guide openings 32.

The method also preferably includes the step of guiding the exposed portions of the strength members 22 through guide hooks 33 for the embodiment of the shield clamping member 31 having at radially outwardly extending guide hooks 33 at a second portion downstream from the first portion. The shield clamping member 31 also preferably includes a third portion upstream from the first portion and overlying a corresponding portion of the cable jacket 23. Accordingly, the method preferably further includes the step of securing the third portion to the fiber optic cable, such as using a tie wrap 64 or other suitable fastener.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A bonding assembly for a fiber optic cable of the type including an elongate core, a metallic shield surrounding the core, at least one strength member extending longitudinally adjacent the shield, and a jacket surrounding the shield and the at least one strength member, the fiber optic cable having a portion of the jacket removed thereby exposing the underlying shield and the at least one strength member, said bonding assembly comprising:

a base member having an end adapted to be inserted between an exposed shield portion and a corresponding underlying core portion of the fiber optic cable;

a shield clamping member adapted to overlie the exposed shield portion and cooperate with said base member for clamping the exposed shield portion therebetween;

a strength member clamping means member adapted to overlie an exposed portion of the at least one strength member and cooperate with said shield clamping member for clamping the exposed portion of the at least one strength member therebetween so that the exposed portion of the at least one strength member first extends in an outward direction and then extends in a generally longitudinal direction; and connecting means adapted for connecting together said base member, said shield clamping member, and said strength member clamping member.

2. A bonding assembly according to claim 1 further comprising an electrical bonding strap having an end adapted to be secured to said connecting means.

3. A bonding assembly according to claim 1 further comprising a plurality of projections extending outwardly from the end of said base member and adapted for enhancing contact with adjacent portions of the shield.

4. A bonding assembly according to claim 1 wherein said shield clamping member has a first portion adapted to be positioned adjacent where the exposed portion of the at least one strength member emerges from the cable jacket, and wherein the first portion of said shield clamping member has at least one guide opening therein adapted for receiving therethrough the exposed portion of the at least one strength member.

5. A bonding assembly according to claim 4 wherein said shield clamping member has a second portion downstream from said first portion, and wherein said shield clamping member further comprises at least one radially outwardly extending guide hook carried by the second portion thereof and adapted for receiving therethrough the longitudinally extending exposed portion of the at least one strength member.

6. A bonding assembly according to claim 4 wherein said shield clamping member includes a third portion upstream from said first portion adapted for overlying a portion of the cable jacket, and further comprising a fastener adapted for surrounding the third portion of the shield clamping member and the underlying portion of the cable jacket.

7. A bonding assembly according to claim 1 wherein said strength member clamping member includes at least one pair of spaced apart projections extending radially inwardly therefrom and adapted for further confining the at least one strength member between said strength member clamping member and said shield clamping member.

8. A bonding assembly according to claim 1 wherein said connecting means comprises a threaded stud carried by said base member and extending radially outwardly therefrom, and wherein said shield clamping member and said strength member clamping member both include correspondingly positioned openings adapted for receiving therethrough said threaded stud.

9. A bonding assembly according to claim 8 further comprising a bonding strap having an end portion adapted to overlie said strength member clamping member, and wherein the end portion of said bonding strap includes an opening therein adapted for receiving therethrough said threaded stud.

10. A bonding assembly according to claim 1 further comprising sealing means adapted for surrounding the exposed portion of the fiber optic cable, said base member, said shield clamping member, and said strength member clamping member for preventing moisture migration from the fiber optic cable.

11. A bonding assembly according to claim 10 wherein said sealing means comprises a heat recoverable tube and a water blocking compound for filling voids underlying said tube.

12. A bonding assembly according to claim 1 wherein each of said base member, said shield clamping member, and said strength member clamping member have an arcuate transverse cross-sectional shape.

13. A bonding assembly for a fiber optic cable of the type including an elongate core, a metallic shield surrounding the core, at least one strength member extending longitudinally adjacent the shield, and a jacket surrounding the shield and the at least one strength member, the fiber optic cable having a portion of the jacket removed thereby exposing the underlying metallic shield and the at least one strength member, said bonding assembly comprising:

a base member having an end adapted to be inserted between an exposed shield portion and a corresponding underlying core portion of the fiber optic cable;

a shield clamping member adapted to overlie the exposed shield portion and cooperate with said base member for clamping the exposed shield portion therebetween, said shield clamping member having a first portion adjacent where the exposed portion of the at least one strength member emerges from the cable jacket, the first portion of said shield clamping member having at least one guide opening therein adapted for receiving therethrough the exposed portion of the at least one strength member;

a strength member clamping member adapted to overlie the exposed portion of the at least one strength member and cooperate with said shield clamping member for clamping an exposed portion of the at least one strength member therebetween so that the exposed portion of the at least one strength member is guided first in an outward direction, and then is guided in a generally longitudinal direction after passing through the at least one guide opening of said shield clamping member; and connecting means adapted for connecting together said base member, said shield clamping member, and said strength member clamping member.

14. A bonding assembly according to claim 13 further comprising an electrical bonding strap having an end adapted to be secured to said connecting means.

15. A bonding assembly according to claim 13 further comprising a plurality of projections extending outwardly from the end of said base member and adapted for enhancing contact with adjacent portions of the shield.

16. A bonding assembly according to claim 13 wherein said shield clamping member has a second portion downstream from said first portion, and wherein said shield clamping member further comprises at least one radially outwardly extending guide hook carried by the second portion thereof and adapted for receiving therethrough the longitudinally extending exposed portion of the at least one strength member.

17. A bonding assembly according to claim 13 wherein said shield clamping member includes a third portion upstream from said first portion adapted for overlying a portion of the cable jacket, and further comprising a fastener adapted for surrounding the third portion of the shield clamping member and the underlying portion of the cable jacket.

18. A bonding assembly according to claim 13 wherein said strength member clamping member includes at least one pair of spaced apart projections extending radially inwardly therefrom and adapted for further confining the at least one strength member between said strength member clamping member and said shield clamping member.

19. A bonding assembly according to claim 13 wherein said connecting means comprises a threaded stud carried by said base member and extending radially outwardly therefrom, and wherein said shield clamping member and said strength member clamping member both include correspondingly positioned openings adapted for receiving therethrough said threaded stud.

20. A bonding assembly according to claim 19 further comprising a bonding strap having an end portion adapted to overlie said strength member clamping member, and wherein the end portion of said bonding strap includes an opening therein adapted for receiving therethrough said threaded stud.

21. A bonding assembly according to claim 13 further comprising sealing means adapted for surrounding the exposed portion of the fiber optic cable, said base member, said shield clamping member, and said strength member clamping member for preventing moisture migration from the fiber optic cable.

22. A bonding assembly according to claim 21 wherein said sealing means comprises a heat recoverable tube and a water blocking compound for filling voids underlying said tube.

23. A bonding assembly according to claim 13 wherein each of said base member, said shield clamping member, and said strength member clamping member have an arcuate transverse cross-sectional shape.

24. A bonding assembly for a fiber optic cable of the type including an elongate core, a metallic shield surrounding the core, at least one strength member extending lontiudinally adjacent the shield, and a jacket surrounding the shield and the at least one strength member, the fiber optic cable having a portion of the jacket removed thereby exposing the underlying shield and the at least one strength member, said bonding assembly comprising:

a base member having an end adapted to be inserted between an exposed shield portion and a corresponding underlying core portion of the fiber optic cable; and clamping means adapted to be connected to said base member and overlie the exposed shield portion for clamping to the exposed shield portion and for clamping to an exposed portion of the at least one strength member and guiding the exposed portion of the at least one strength member to extend first in an outward direction and then in a generally longitudinal direction.

25. A bonding assembly according to claim 24 further comprising a bonding strap having an end adapted to be connected to said clamping means.

26. A bonding assembly according to claim 24 wherein said base member further comprises a plurality of projections extending outwardly therefrom and adapted for enhancing contact with adjacent portions of the shield.

27. A bonding assembly according to claim 24 further comprising a threaded stud carried by said base member and extending radially outwardly therefrom, and wherein said clamping means is secured to said base member by said threaded stud.

28. A method for bonding a fiber optic cable of the type having a core, a metallic shield surrounding the core, at least one longitudinally extending strength member extending longitudinally adjacent the shield, and a jacket surrounding the metallic shield and the at least one strength member, the fiber optic cable having a portion of the jacket removed thereby exposing the underlying shield and the at least one strength member, said method comprising the steps of:

establishing both an electrical and mechanical connection to an exposed shield portion of the fiber optic cable;

guiding an exposed portion of the at least one strength member to extend first in an outward direction and then in a longitudinal direction adjacent the electrical and mechanical connection to the exposed shield portion; and securing the longitudinally extending exposed portion of the at least one strength member to the electrical and mechanical connection to the exposed shield portion.

29. A method according to claim 28 wherein the step of establishing both the electrical and mechanical connection comprises the steps of:

providing a base member and inserting an end portion thereof between the exposed shield portion and a corresponding underlying core portion of the fiber optic cable; and providing a shield clamping member and clamping the shield clamping member overlying the exposed shield portion.

30. A method according to claim 28 wherein the step of securing the longitudinally extending exposed portion of the at least one strength member comprises the steps of providing a strength member clamping member and clamping same overlying the exposed portion of the at least one strength member.

31. A method according to claim 30 wherein the base member includes a threaded stud extending radially outwardly therefrom, and wherein the shield clamping member and the strength member clamping member include openings therein, and wherein the steps of clamping both the shield clamping member and the strength member clamping member comprise positioning the threaded stud through respective openings in both and securing an end of the threaded stud.

32. A method according to claim 29 wherein the shield clamping member includes at least one guide opening in a first portion thereof adjacent where the exposed portion of the at least one strength member emerges from the cable jacket, and wherein the step of guiding the exposed portion of the at least one strength member comprises positioning same through the at least guide opening.

33. A method according to claim 29 wherein the shield clamping member includes at least one radially outwardly extending guide hook at a second portion downstream from the first portion, and wherein the step of guiding the exposed portion of the at least one strength member further comprises positioning same through the at least guide hook.

34. A method according to claim 32 wherein the shield clamping member includes a third portion upstream from the first portion and overlying a corresponding portion of the cable jacket, and further comprising the step of securing the third portion to the fiber optic cable.

35. A method according to claim 28 further comprising the step of securing an electrical bonding strap to the electrical connection to the exposed shield portion.

36. A method according to claim 28 further comprising the step of sealing the fiber optic cable and the electrical and mechanical connection to the exposed shield portion for preventing moisture migration from the fiber optic cable.

* * * * *